United States Patent
Brooking et al.

(10) Patent No.: US 8,325,029 B2
(45) Date of Patent: Dec. 4, 2012

(54) MULTIPLE COLOR MULTI-FUNCTIONAL LIGHT BAR

(75) Inventors: Richard Brooking, Weston, FL (US); Anthony Chun Hua Chan, Tucheng (TW)

(73) Assignees: Brookings Industries, Inc., Sunrise, FL (US); Juluen Enterprises Co., Ltd., Shulin, Taipei Hsien (TW)

( * ) Notice: Subject to any disclaimer, the term of this patent is extended or adjusted under 35 U.S.C. 154(b) by 436 days.

(21) Appl. No.: 12/574,272

(22) Filed: Oct. 6, 2009

(65) Prior Publication Data

US 2010/0085181 A1 Apr. 8, 2010

Related U.S. Application Data

(60) Provisional application No. 61/195,296, filed on Oct. 6, 2008.

(51) Int. Cl.
*B60Q 1/26* (2006.01)
*G08B 5/22* (2006.01)

(52) U.S. Cl. ........ 340/468; 340/463; 340/469; 340/471; 340/815.45

(58) Field of Classification Search .................. 340/461, 340/463, 468, 469, 471, 472, 815.42, 815.45, 340/815.47, 815.75, 815.78; 600/407, 476; 116/284, 286, 288; 345/31, 48, 105; 180/65.1, 180/220, 221

See application file for complete search history.

(56) References Cited

U.S. PATENT DOCUMENTS

| | | | |
|---|---|---|---|
| 1,674,340 A | 6/1928 | Nock | |
| 3,665,392 A | 5/1972 | Annas | |
| 4,575,782 A | 3/1986 | Levine | |
| 4,758,931 A | 7/1988 | Gabaldon | |
| 4,818,010 A | 4/1989 | Dillon | |
| 4,981,363 A | 1/1991 | Lipman | |
| 5,050,050 A | 9/1991 | Alder | |
| 5,050,051 A | 9/1991 | Machida | |
| 5,096,287 A | 3/1992 | Kakinami | |
| 5,130,906 A | 7/1992 | Lund | |
| 5,211,466 A | 5/1993 | Jarocki | |
| 5,296,840 A | 3/1994 | Gieffers | |
| 5,505,519 A | 4/1996 | Natt | |
| 5,931,573 A | 8/1999 | Knox | |
| 5,949,346 A * | 9/1999 | Suzuki et al. | 340/815.45 |
| 6,081,191 A | 6/2000 | Green et al. | |
| 6,092,916 A | 7/2000 | Davis | |
| 6,181,243 B1 | 1/2001 | Yang | |
| 6,511,216 B2 | 1/2003 | Strickland | |
| 6,842,110 B2 | 1/2005 | Quigley et al. | |
| 6,995,681 B2 | 2/2006 | Pederson | |
| 7,036,965 B2 | 5/2006 | Dalton, Jr. et al. | |
| 7,040,443 B1 * | 5/2006 | Roth et al. | 180/221 |
| 7,261,447 B2 | 8/2007 | Menke et al. | |
| 7,308,296 B2 * | 12/2007 | Lys et al. | 600/407 |
| 7,352,339 B2 * | 4/2008 | Morgan et al. | 345/31 |

* cited by examiner

*Primary Examiner* — Van T. Trieu
(74) *Attorney, Agent, or Firm* — King & Schickli, PLLC

(57) ABSTRACT

A multiple color multi-function light bar for a law enforcement vehicle, emergency vehicle, tow truck or the like. The light bar includes a plurality of light emitting diodes aligned in a single row. Each of the plurality of light emitting diodes are configured to emit two different colors of light through a single optical lens. Advantageously, the light bar is capable of producing a single color light pattern and a dual color light pattern based upon the particular emergency or traffic control situation encountered by an operator of the vehicle.

20 Claims, 20 Drawing Sheets

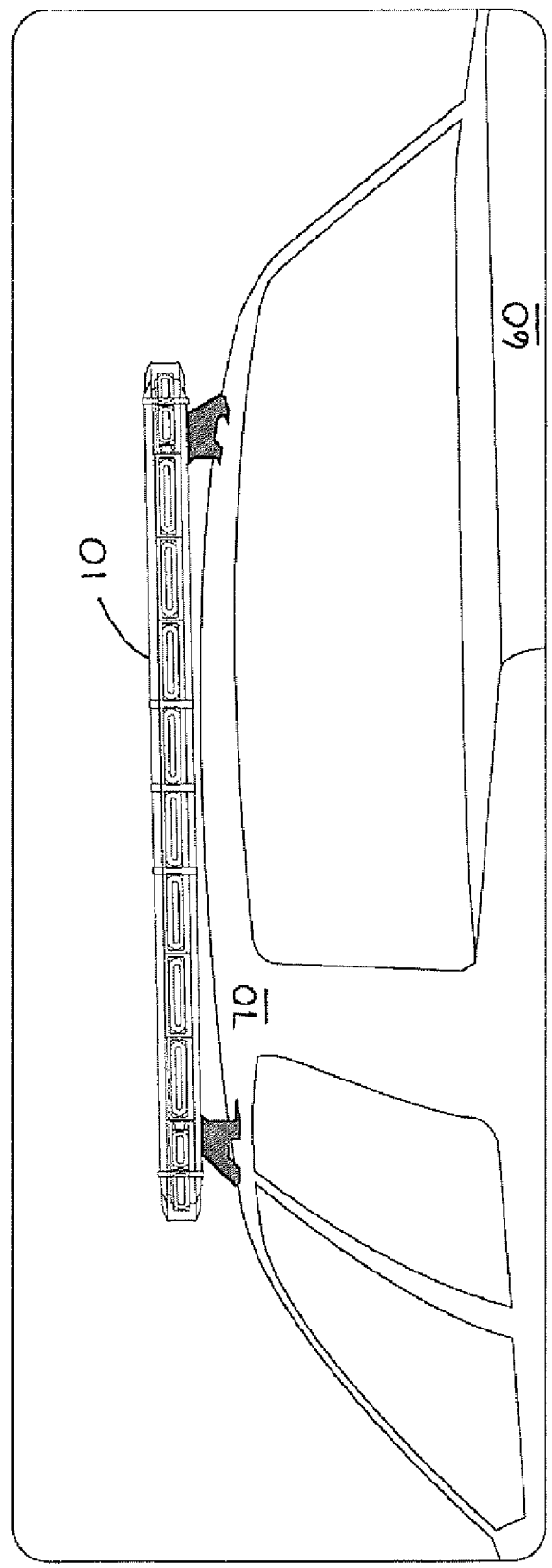

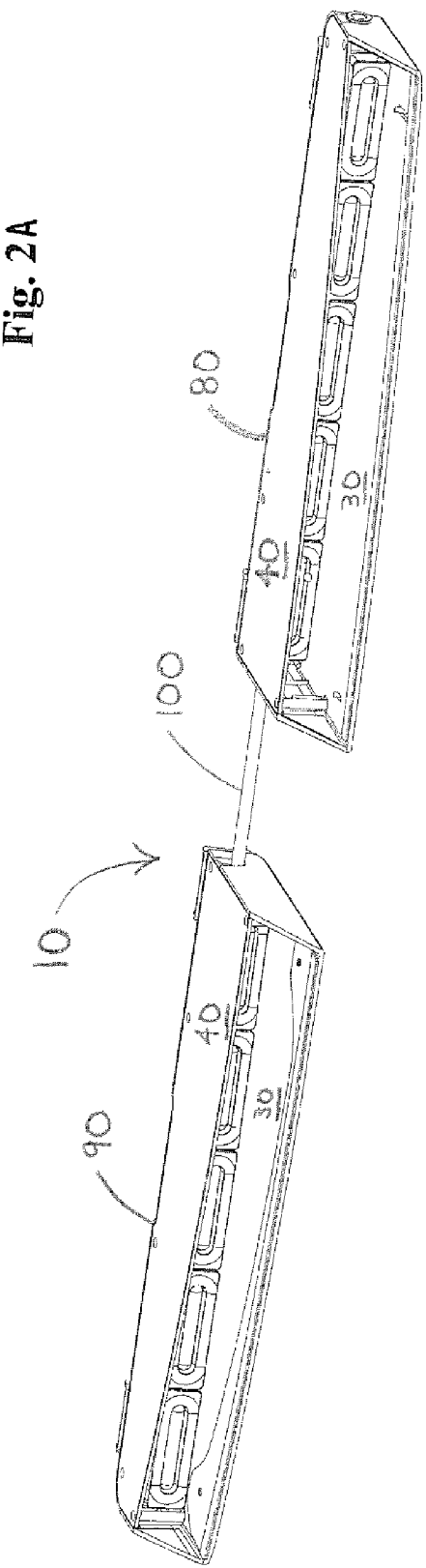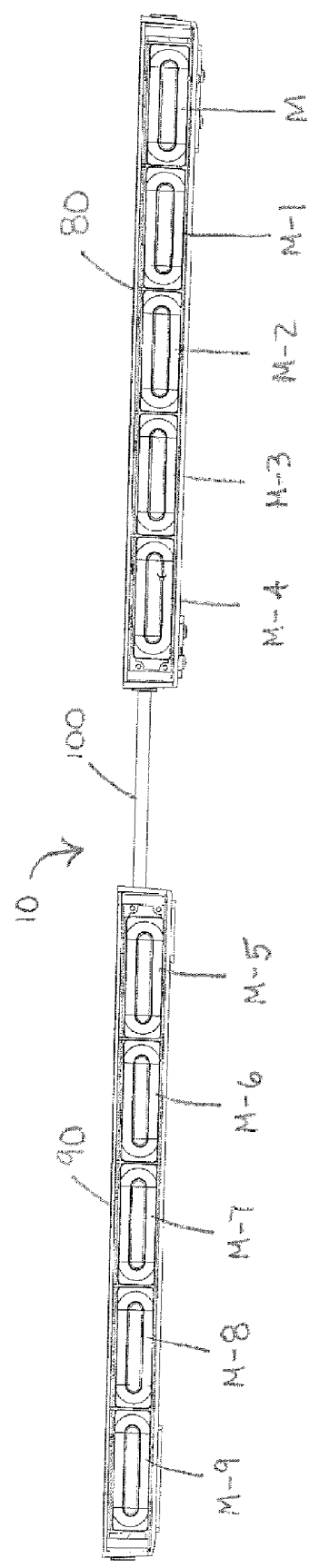

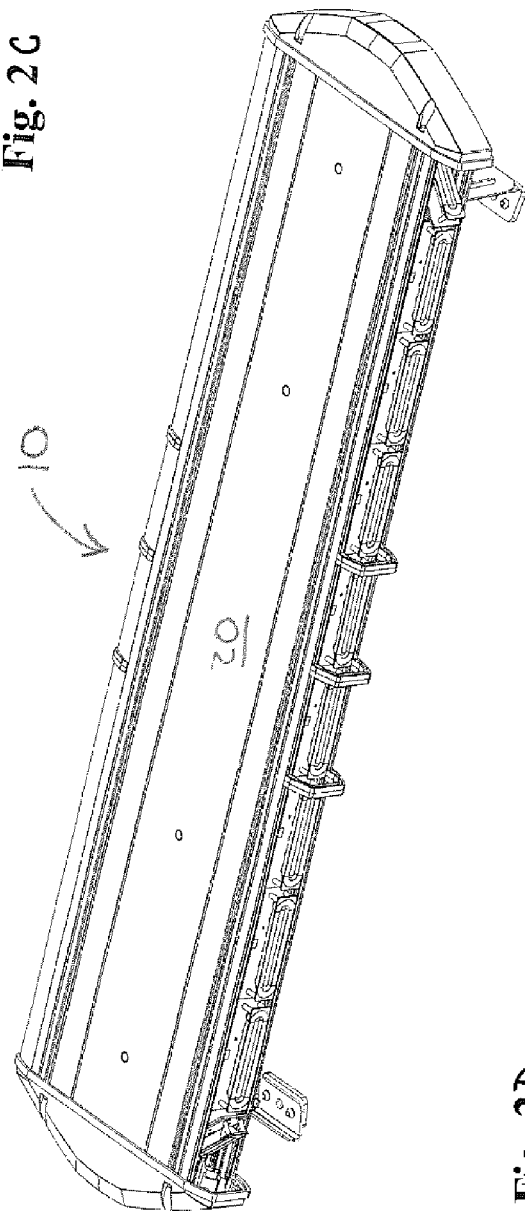
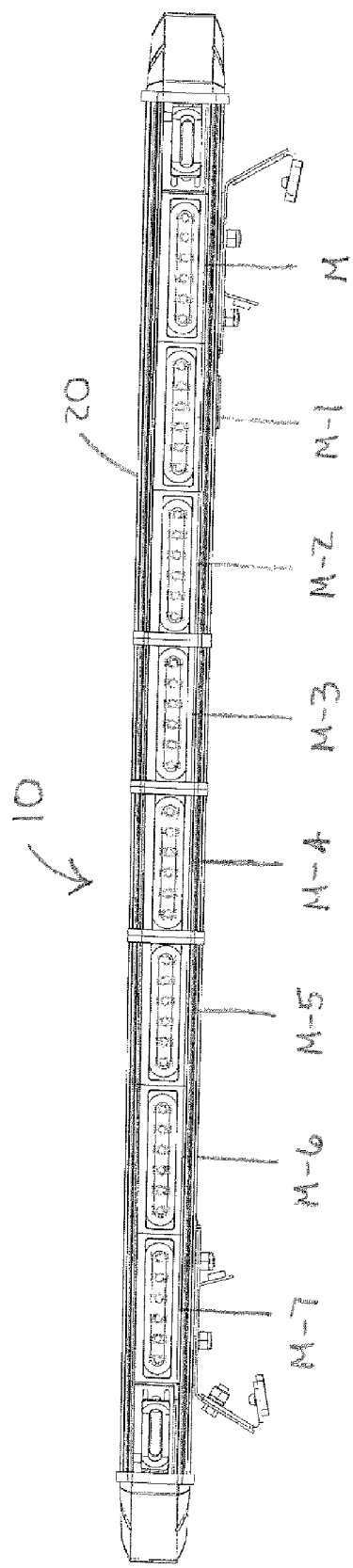
Fig. 2C
Fig. 2D

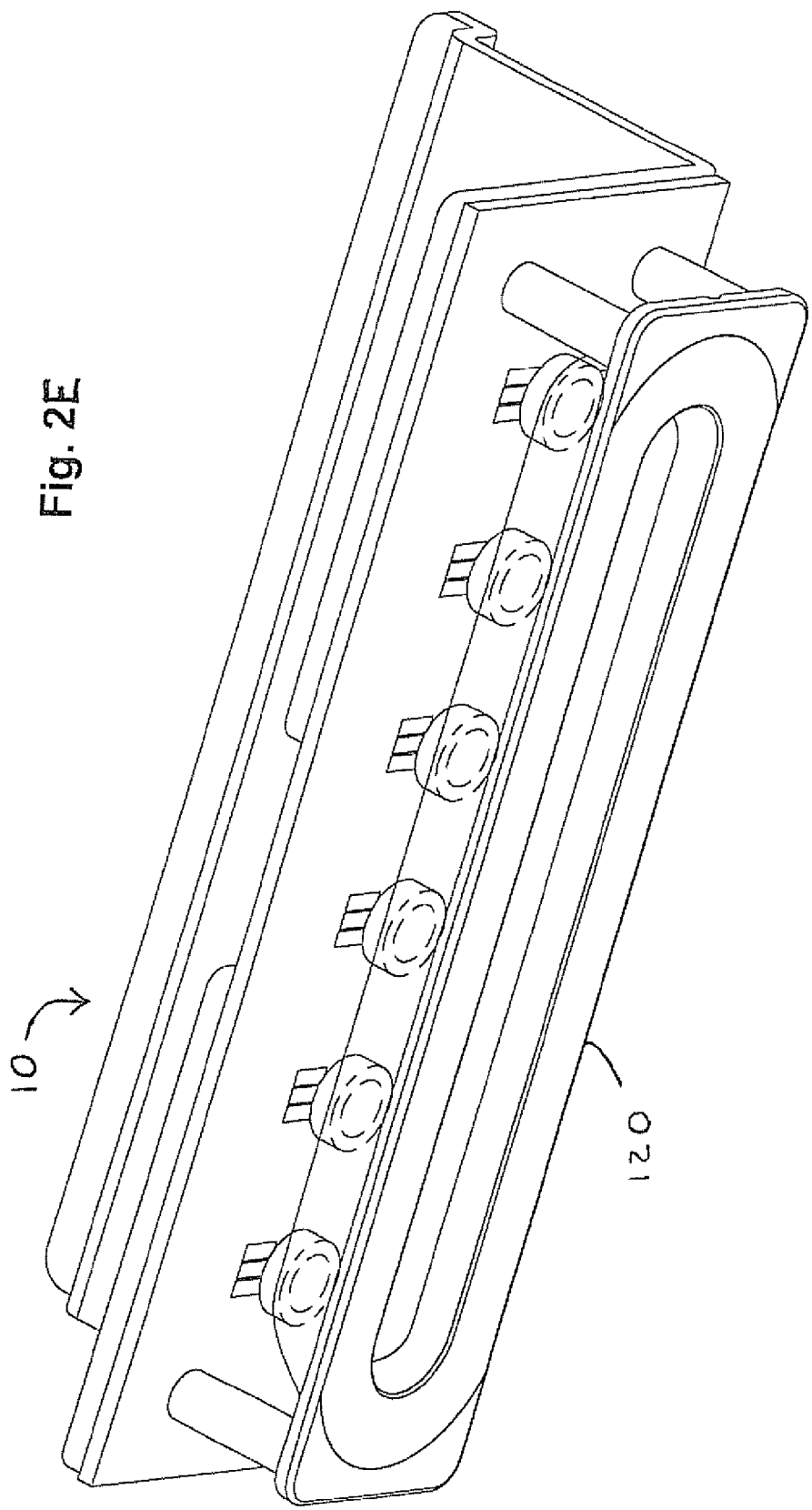

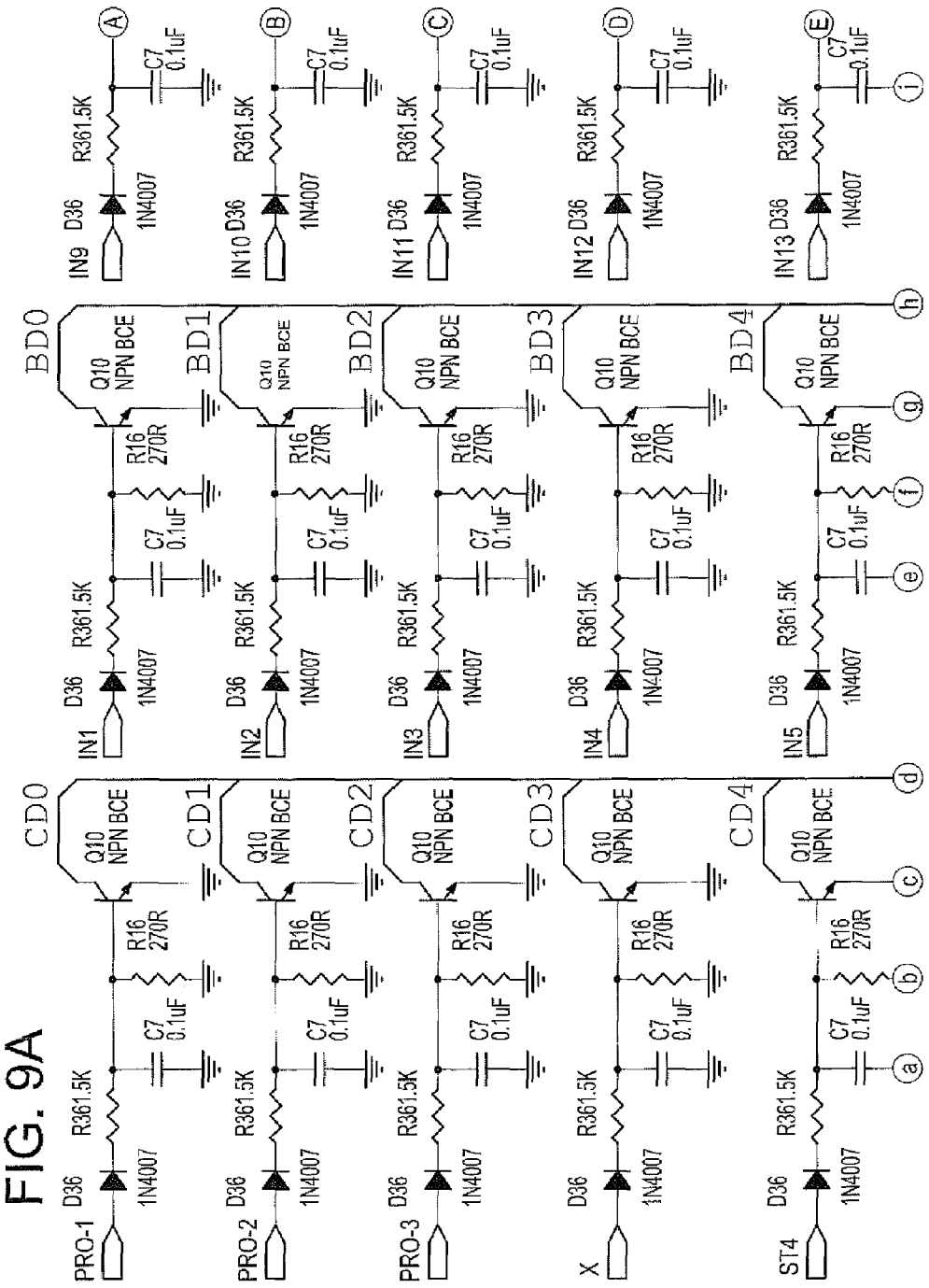

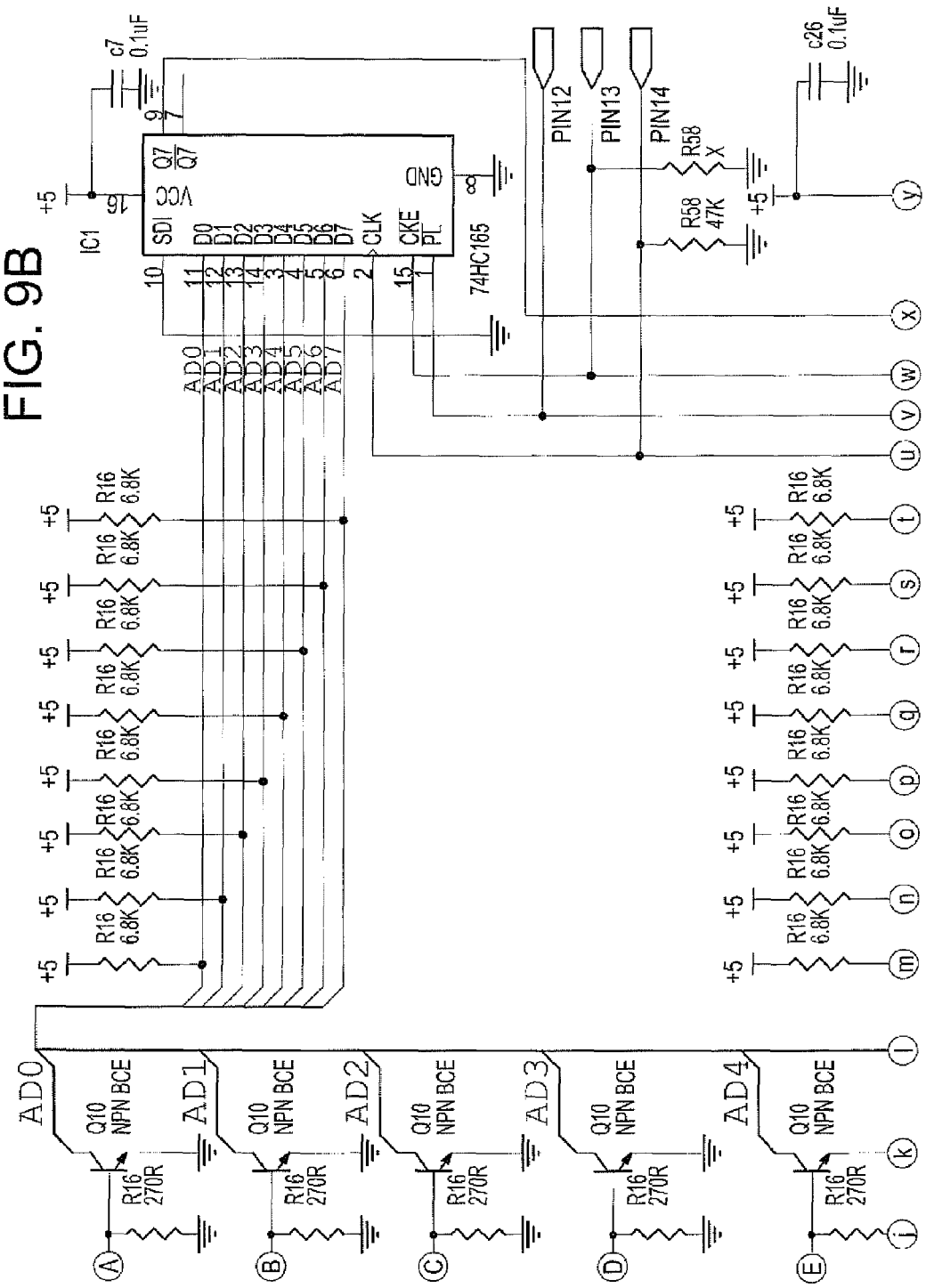

MULTIPLE COLOR MULTI-FUNCTIONAL LIGHT BAR

This application claims the benefit of U.S. Provisional Patent Application Ser. No. 61/195,296, filed on Oct. 6, 2008, the disclosure of which is incorporated herein by reference.

FIELD OF THE INVENTION

The present invention relates generally to a light bar for providing external illumination from a vehicle, such as a law enforcement vehicle, emergency vehicle, tow truck or the like. In particular, it relates to a light bar for mounting in the interior or exterior of the vehicle including multiple light emitting diodes (LEDs) configured to emit different colors of light. Each individual LED emits two different colors through a single optical lens in order to optimize manufacturing and control costs related to the light bar. The light bar provides multiple external illumination patterns to alert other motorists and pedestrians to the presence of the vehicle and the particular traffic control or emergency situation.

BACKGROUND OF THE INVENTION

It is well known to use visual light signals on law enforcement vehicles, emergency vehicles, tow trucks or the like for increasing the visibility of these vehicles to motorists and pedestrians in emergency and traffic control situations. One of the most common types of light signals is a light bar. Light bars are typically mounted to the exterior roof or top of the emergency or law enforcement vehicles. Alternatively, light bars may be mounted within the interior of these vehicles such that they are visible through the front, side or rear windows.

Generally, light bars may be illuminated by utilizing light sources, such as a plurality of light emitting diodes (LEDs) or halogen lamps to produce different light signals. These light signals may include different colors and/or illumination patterns. The variety of light signals, colors and patterns are useful for generating different visual displays depending on the particular traffic control or emergency situation. As a result, motorists or pedestrians approaching these vehicles may easily view the light display and understand the particular situation based upon the signal, color or pattern being displayed.

In one arrangement, the light bar located on the roof or within the rear window of the vehicle, may display a single color (i.e., red or blue) or a multiple color (i.e., red and blue) warning signal. Once a law enforcement or emergency vehicle stops a target or reaches the scene of a vehicular accident, the operator (i.e., police officer, paramedic or tow truck operator) may activate the light bar to generate the warning signal from the vehicle. In the single color arrangement, the light bar features a single row of LEDs. Alternatively, in the dual color arrangement, the light bar typically consists of two stacked rows of LEDs. Effectively, there are at least two rows or columns of multiple different colored LEDs (i.e., one row contains a plurality of LEDs capable of displaying a first color and the other row contains a plurality of LEDs capable of displaying a different second color). Generally, the colors of the LEDs may be red, blue, amber, or white/clear.

Each row of LEDs disseminates light through an optic or lens (i.e., separate optics or lens are required for each LED and row), essentially two different optics or lens in one light source. In other words, there must be at least two different LEDs corresponding to each optic or lens to produce the different colored pattern (i.e., one LED produces red while the second LED produces blue). The operator also has the option of choosing either top or bottom clusters to select the color or select a random pattern, which will alternate between the two rows/colors or flash both sequentially.

In another arrangement, the light bar is equipped with LEDs that are capable of producing illuminated directional functions, such as an "arrow stick." In use, the light bar displays the arrow stick configuration, which is typically a single color, such as amber. The pattern displayed is the sequential illumination of the LEDs in the light bar in one direction or the other to direct drivers to one side of the road or the other. When a law enforcement officer reaches a traffic accident on the right side of the highway, the light bar may be used to produce the arrow stick to direct other drivers to the left lanes of the highway. Alternatively, the arrow stick is also capable of being operated to direct drivers to the right lanes of the highway or "center out" (such as when there is an accident or delay in the middle lane of the highway).

The primary disadvantage with the above-identified type of light bars is that they are limited to a single function. Specifically, the light bar may be used only in either warning/emergency mode with a multiple color (i.e., red and blue) illumination pattern or traffic direction mode with a single color (i.e., amber) illumination pattern. Clearly, law enforcement officers and other emergency personnel encounter different traffic control and emergency situations, which necessitate the use of different light signals of varying colors and patterns.

One common approach to the above-identified problem is to install multiple light bars on the law enforcement or other emergency vehicle. For example, an exterior first light bar may be positioned on the roof of the vehicle for producing a red and/or blue emergency signal and an interior second light bar may be positioned in the rear window for producing various amber-colored traffic signals. Of course, the use of multiple light bars is necessarily more expensive due to the purchase and installation costs associated with each light bar. In addition, the installation of multiple light bars is often difficult due to the limited amount of space in and around the emergency vehicle. Finally, each light bar usually requires its own controller/operator unit to control the light bar, which increases the complexity of the installation and operation of the multiple light bars.

An alternative to using multiple light bars is a light bar having multiple LEDs with different banks or rows/columns of different colored LEDs. The different colored LEDs operate independent of each other in single color modes. As a result, a single light bar is capable of producing multiple different colors based on how many different colored LEDs are used. Although this type of light bar is capable of producing different colors and, in turn, different illumination patters, it suffers from certain limitations. Specifically, the light bar requires a greater number of LEDs (i.e., if the light bar produces red, blue and amber colored patterns, there must be multiple red, blue and amber LEDs) than other single color light bars. Further, due to the large number of LEDs, the light bar is more expensive to manufacture and the particular arrangement (i.e., banks or rows) of LEDs contributes to a larger and bulkier light bar that is difficult to install. Finally, if a smaller light bar is desired to minimize the cost of the light bar or is required due to the size constraints of the particular vehicle, fewer LEDs must be used. Consequently, the light output of the light bar is compromised and the warning signal is less effective.

Accordingly, there is a need for a light bar for use in a law enforcement vehicle, emergency vehicle, tow truck or the like that is capable of displaying multiple colors and patterns corresponding to different emergency and warning signals. Namely, the light bar should be capable of producing a multiple color and pattern emergency/warning signal and a single color traffic direction signal through a single optical lens. The light bar should include a plurality of LED packages aligned in a single row wherein each individual diode is capable of changing color. As a result, the light bar can be made smaller and more efficient in terms of cost and complexity to manufacture without losing any light output strength.

SUMMARY OF THE INVENTION

The above-mentioned and other problems become solved by applying the principles and teachings associated with the hereinafter described multiple color multi-functional light bar.

In a basic sense, the light bar includes a plurality of light emitting diodes (LEDs) aligned in a single row. Each of the plurality of LEDs are configured to emit two different colors of light (i.e., red and amber, blue and amber, or red and blue) through a single optical lens. As a result, the light bar is capable of producing a single color light pattern and a dual color light pattern based upon the particular emergency or traffic control situation. For example, the light bar may produce a red and blue flashing pattern in warning/emergency mode and a variety of amber-colored signals in traffic directional mode, such as "arrow stick" configurations.

Advantageously, the emergency vehicle may be equipped with a single multiple color multi-function light bar, which is capable of displaying multiple patterns and colors instead of being equipped with multiple light bars which are limited to a single color and/or function. The use of multiple light bars is more expensive due to the purchase and installation costs associated with each light bar and the installation of multiple light bars is difficult due to the limited amount of space in and around the emergency vehicle. In addition, the multiple color multi-function light bar is smaller, less expensive and less complex to manufacture without losing any light output strength due to the single row of LEDs that are capable of changing colors.

In one embodiment, the light bar has a housing with a base and a cover. The housing has a plurality of transparent modules that are equally positioned adjacent to each other along the length of the housing, but do not contact one another. Each module includes a plurality of LED packages and a secondary optic lens, which is typically used with high powered LEDs to narrow down the angle of light output and project the light outwards. Each LED package includes an individual diode, two light emitting chips, a set of leads connecting the individual diode to the light emitting chips and a primary optical lens. The LED packages as well as the individual diodes are aligned side-by-side creating a single row within any particular module. Each individual diode in the LED package will produce a light in a first color or a second color when properly biased. To appropriately bias the individual diode, a drive signal from one of the pair of LED chips is sent through the leads to trigger the individual diode to produce a desired color.

Still other objects of the present invention will become apparent to those skilled in the art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1B is a representative view in accordance with one embodiment of the present invention of the light bar mounted on the roof of the law enforcement vehicle;

FIG. 2A is a perspective view in accordance with one embodiment of the present invention of a dual housing light bar;

FIG. 2B is a front view in accordance with one embodiment of the present invention of the dual housing light bar;

FIG. 2C is a perspective view in accordance with one embodiment of the present invention of a single housing light bar;

FIG. 2D is a front view in accordance with one embodiment of the present invention of the single housing light bar;

FIG. 2E is a partial exploded view in accordance with one embodiment of the present invention of a secondary optic lens;

FIGS. 9A-9D are schematic diagrams in accordance with one embodiment of the present invention of the circuitry.

DETAILED DESCRIPTION OF THE INVENTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process or other changes may be made without departing from the scope of the present invention. The following detailed description is, thus, not to be taken in a limiting sense.

As best perhaps best illustrated in FIGS. 2A-2E, the present invention relates to a multiple color multi-functional light bar 10. Specifically, the light bar 10 includes a housing 20 with a base 30 and a cover 40. The base 30 and cover 40 of the housing 20 are designed to direct or project the light from the light bar 10 out of the vehicle to provide external illumination to other motorists and pedestrians. Moreover, the base 30 and cover 40 prevent the light from the light bar from distracting the driver of the emergency vehicle.

Figure 1A:
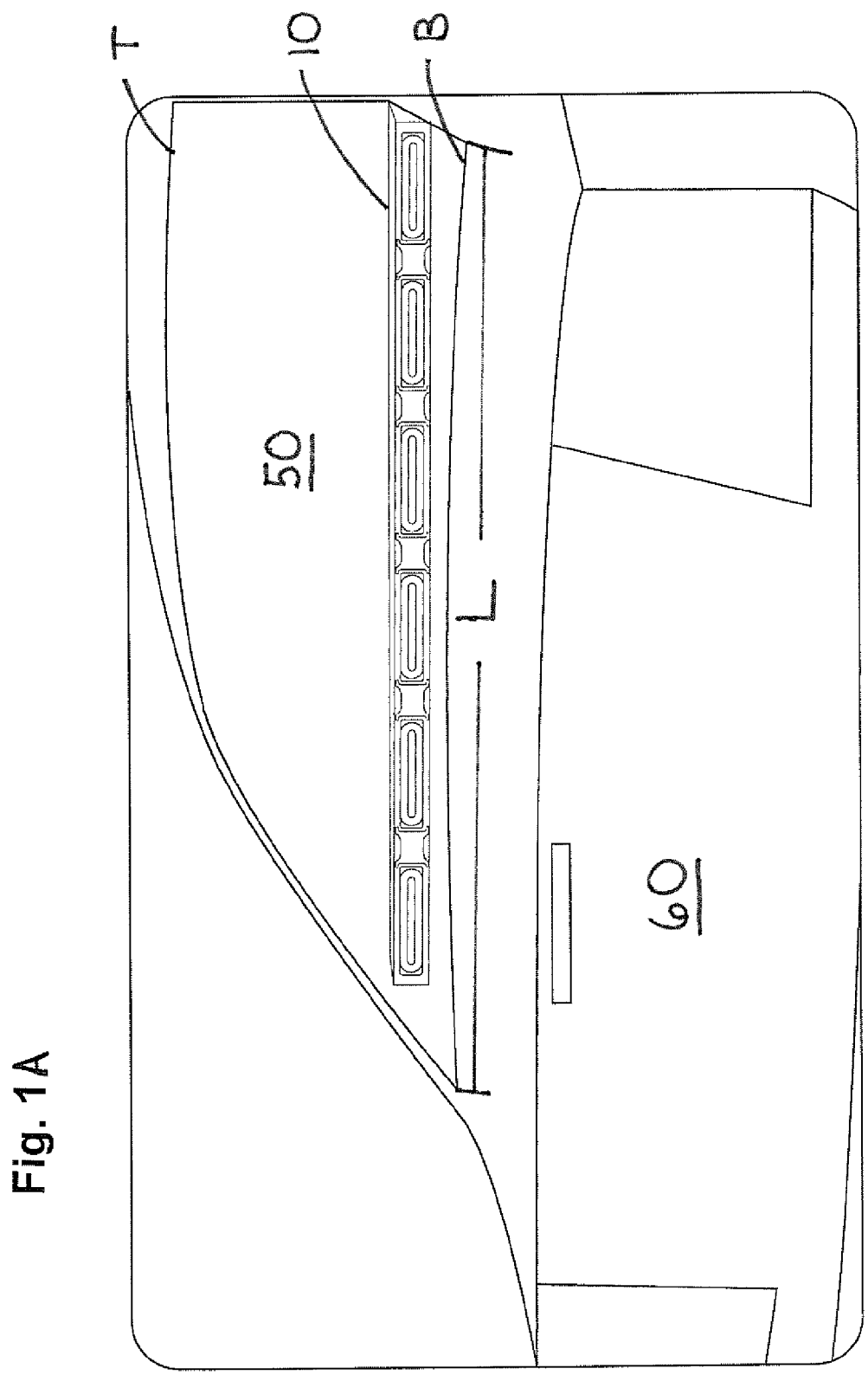
FIG. 1A is a representative view in accordance with one embodiment of the present invention of a light bar mounted within a rear window of a law enforcement vehicle.

With reference to FIG. 1A, the base 30 of the light bar 10 may be mounted within a rear window 50 of a law enforcement vehicle 60 such that the light bar 10 extends longitudinally along the length L of the bottom B of the rear window 50. In another embodiment, the cover 40 of the light bar 10 may be mounted within a rear window 50 of a law enforcement vehicle 60 such that the light bar 10 extends longitudinally along the length L of the top T of the rear window 50. In yet another embodiment, the base 30 of the light bar 10 may be mounted to the roof 70 of the law enforcement vehicle 60 as illustrated in FIG. 1B. In addition to law enforcement vehicles, the light bar may be used in conjunction with other emergency vehicles, tow trucks or the like.

Turning back to FIGS. 2A and 2B, the housing 20 of the light bar 10 may be divided into a first housing 80 and a second housing 90 connected by a cable 100. Both the first housing 80 and the second housing 90 include a plurality of modules or light heads (M, M-1, M-2 ... M-9). Depending on whether the light bar is mounted in the interior or exterior of the emergency vehicle, the modules may not necessarily be coplanar. For example, the modules may be staggered to accommodate the curvature in the front windshield or rear window (i.e., M is closer to the window than M-1, which is closer to the window than M-2 and so on). On the other hand, the modules may be substantially coplanar in a light bar mounted to the roof of the vehicle.

The modules M are transparent or clear and are substantially equally positioned adjacent to each other along the length of the housing but do not contact one another. Both the first housing 80 and the second housing 90 include five modules. Of course, the number of modules within the dual housing light bar may vary depending on the type of application and the mounting options for the light bar in a particular vehicle. Furthermore, as alternatively shown in FIGS. 2C and 2D, the housing 20 of the light bar 10 may be a single structure with a plurality of modules (M, M-1, M-2 ... M-7). Again, depending on the type of application and the mounting options for the single housing light bar in a particular vehicle, the number of modules may vary.

Figure 5:
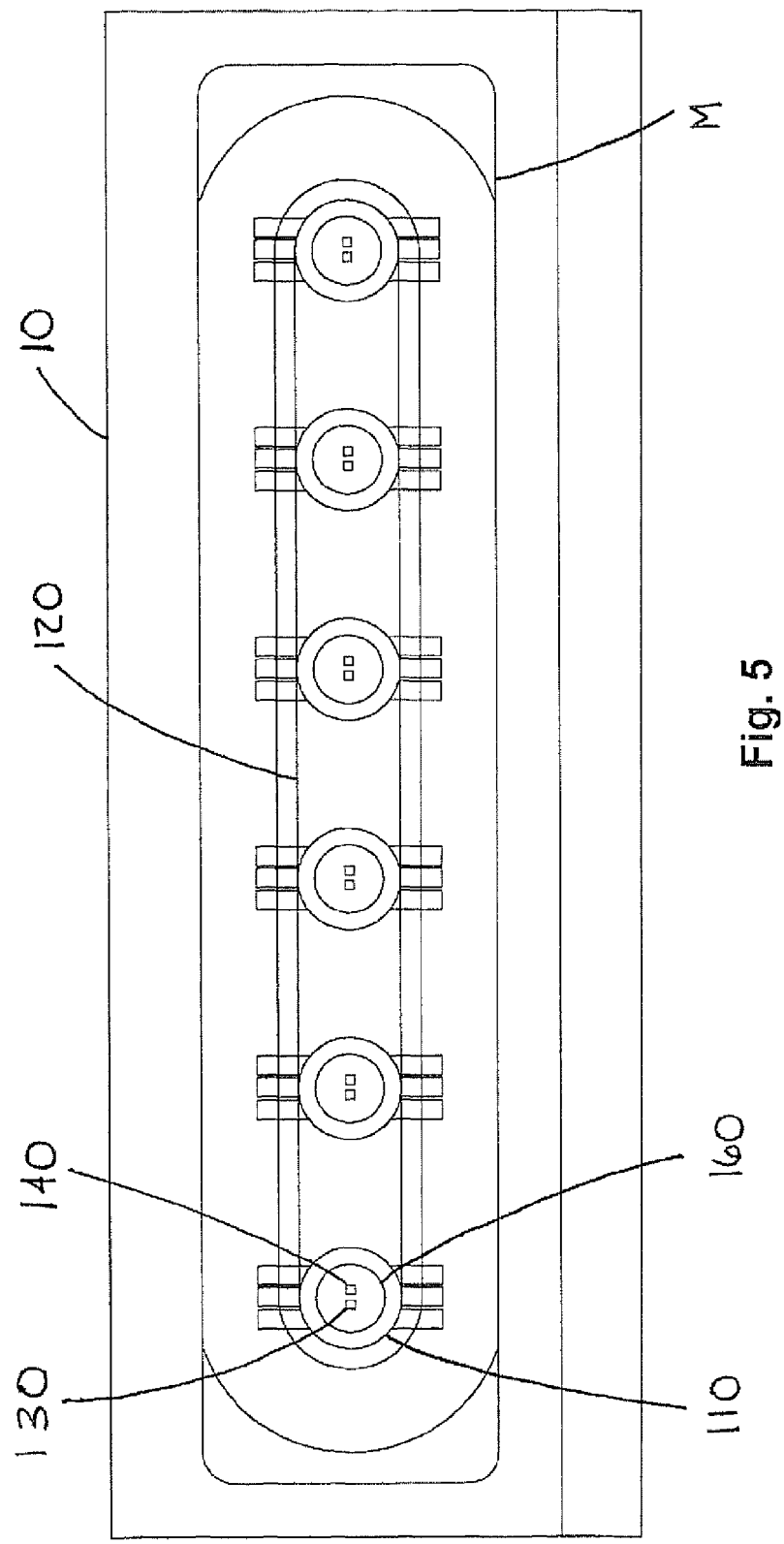
FIG. 5 is a top view in accordance with one embodiment of the present invention of an individual module.
Figure 6A:
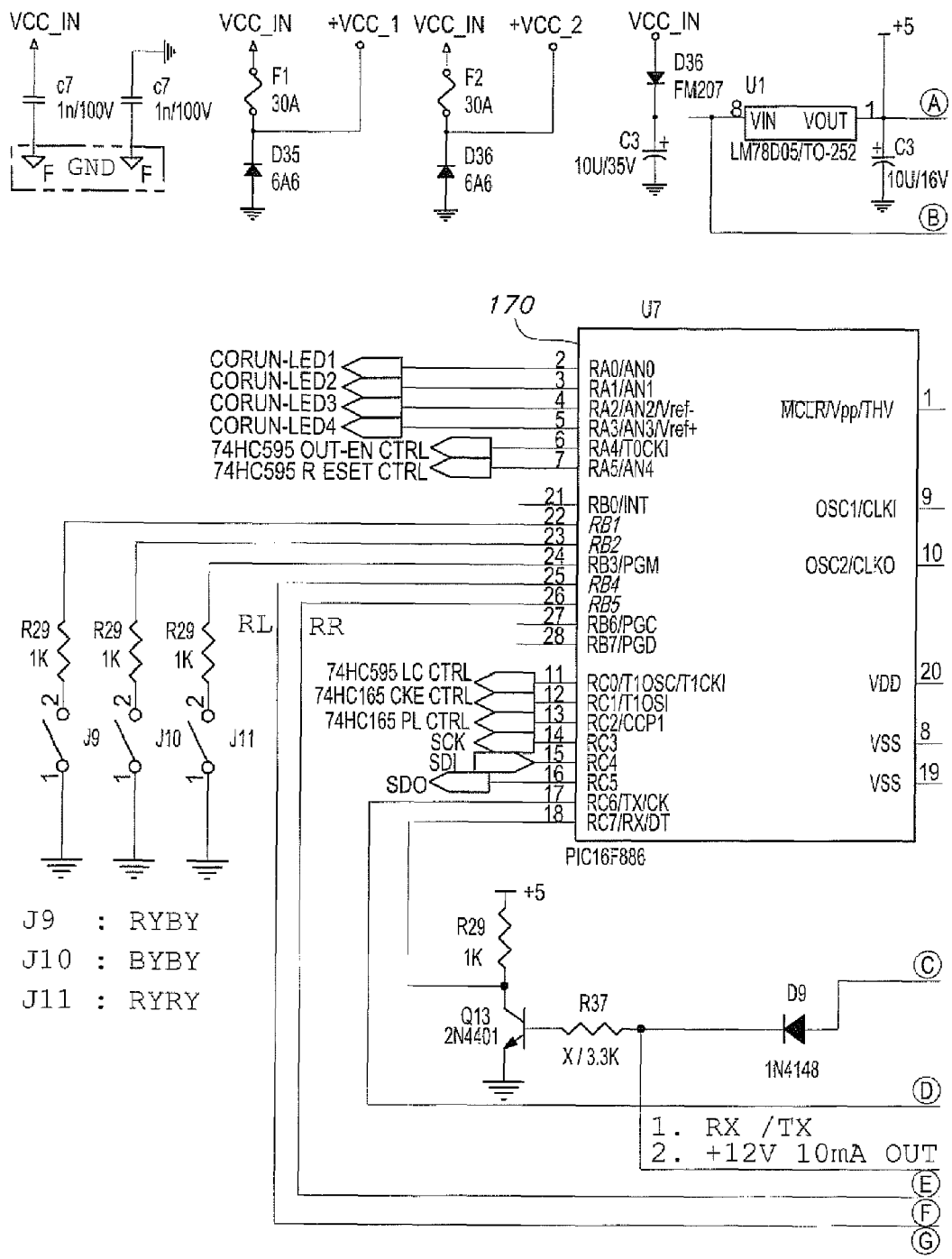
FIGS. 6A and 6B are schematic diagrams in accordance with one embodiment of the present invention of the controller circuitry.
Figure 6B:
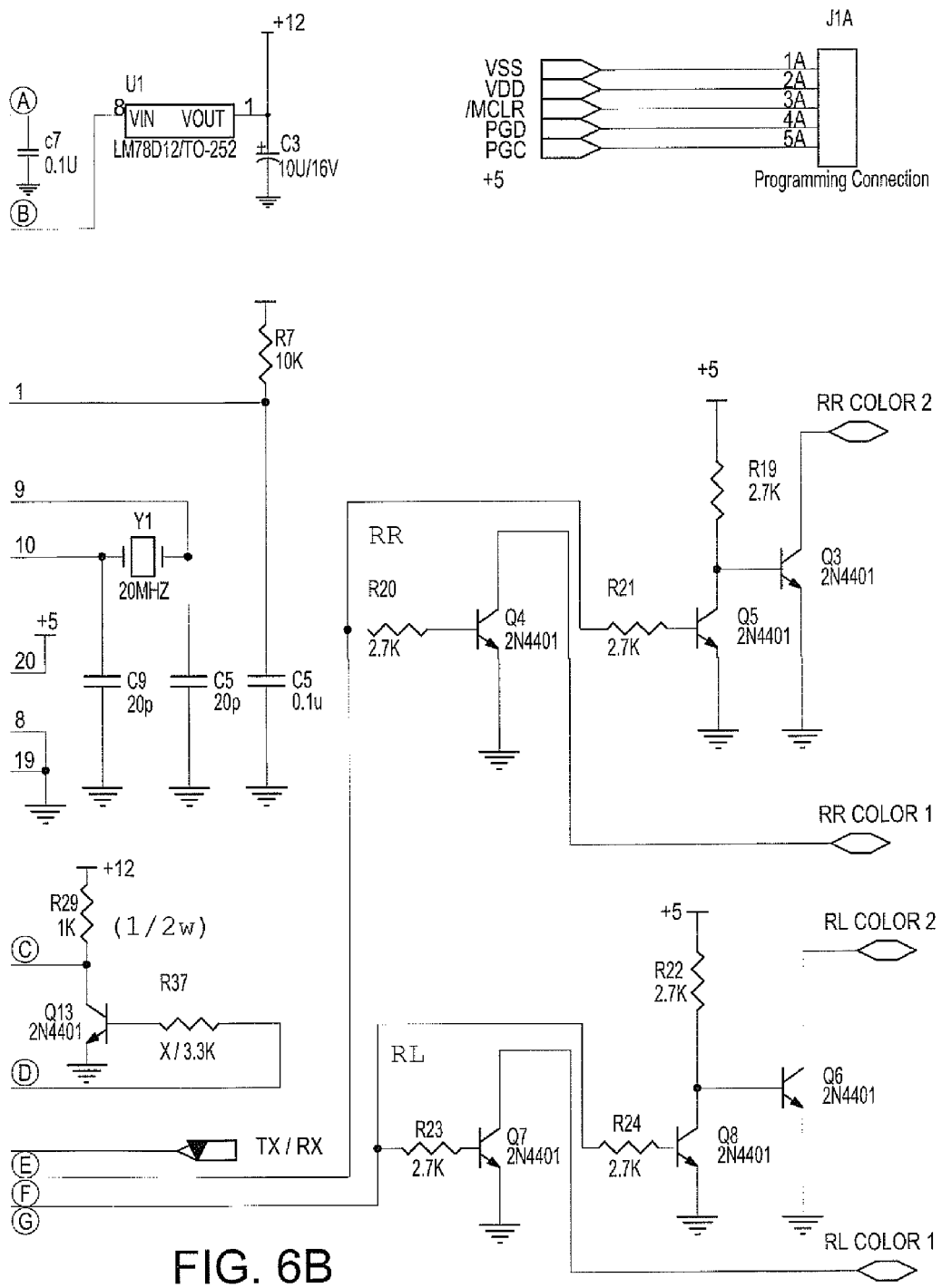
Figure 7A:
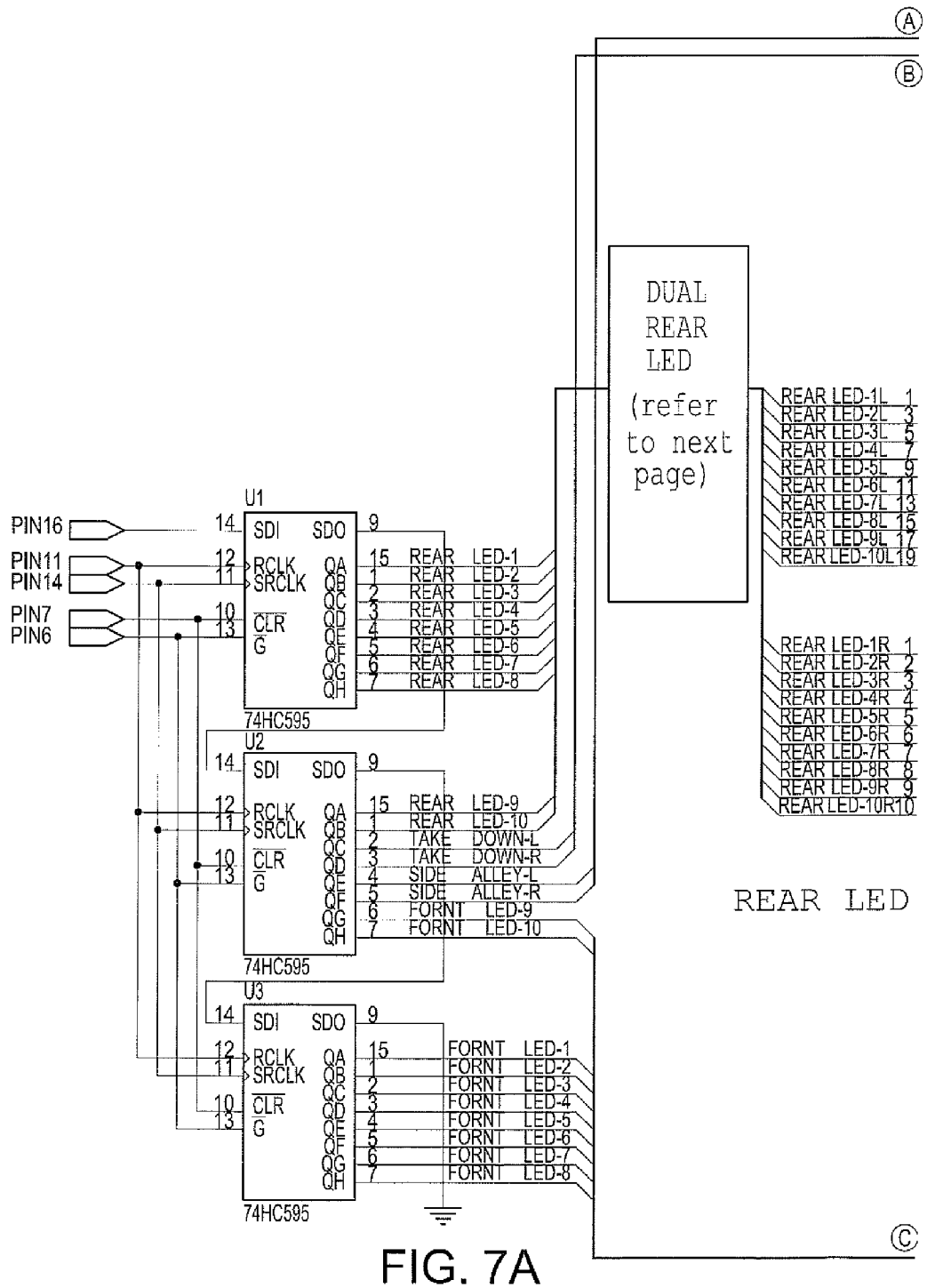
FIGS. 7A-7D are schematic diagrams in accordance with one embodiment of the present invention of the light bar circuitry.
Figure 7B:
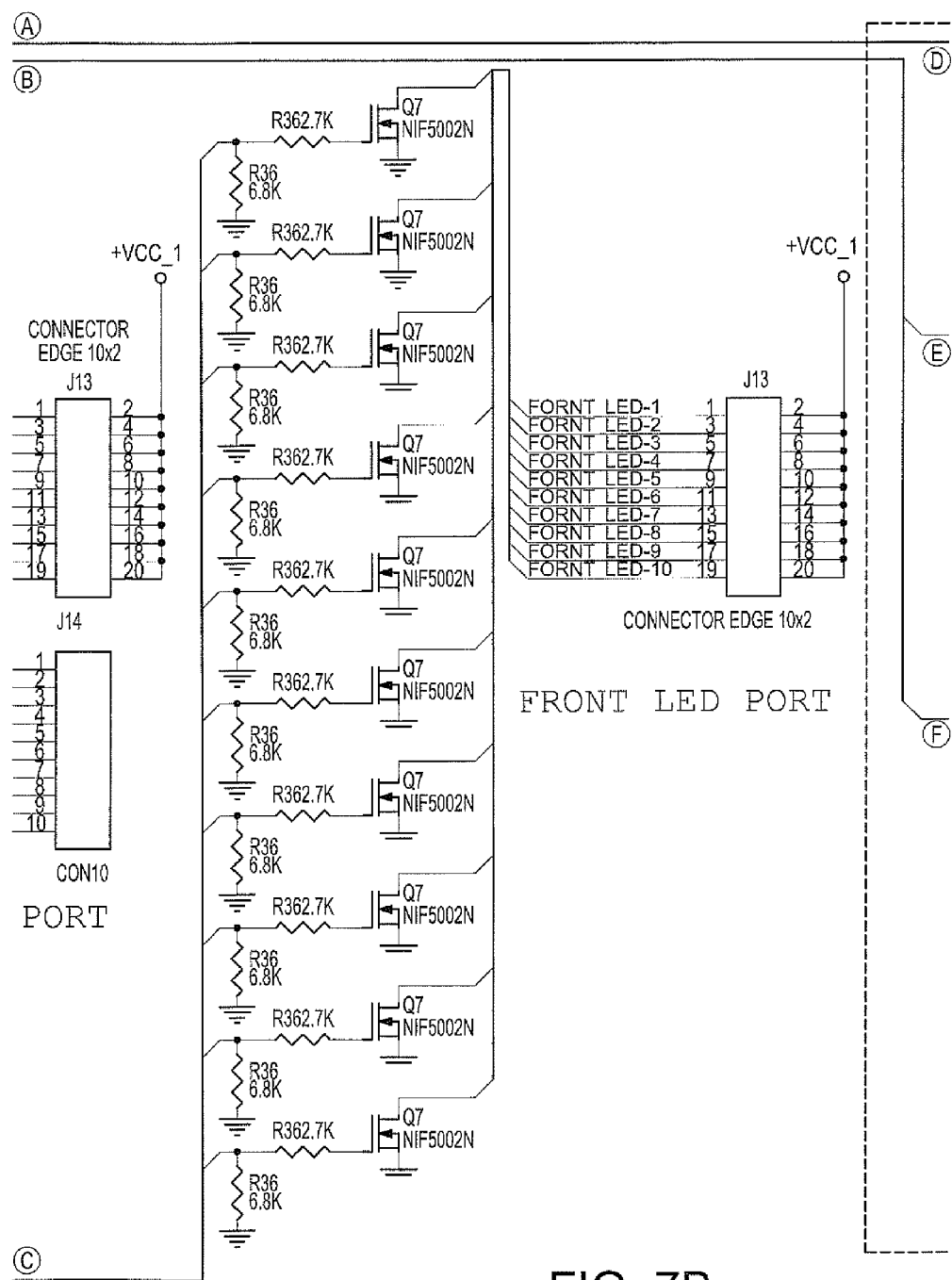
Figure 7C:
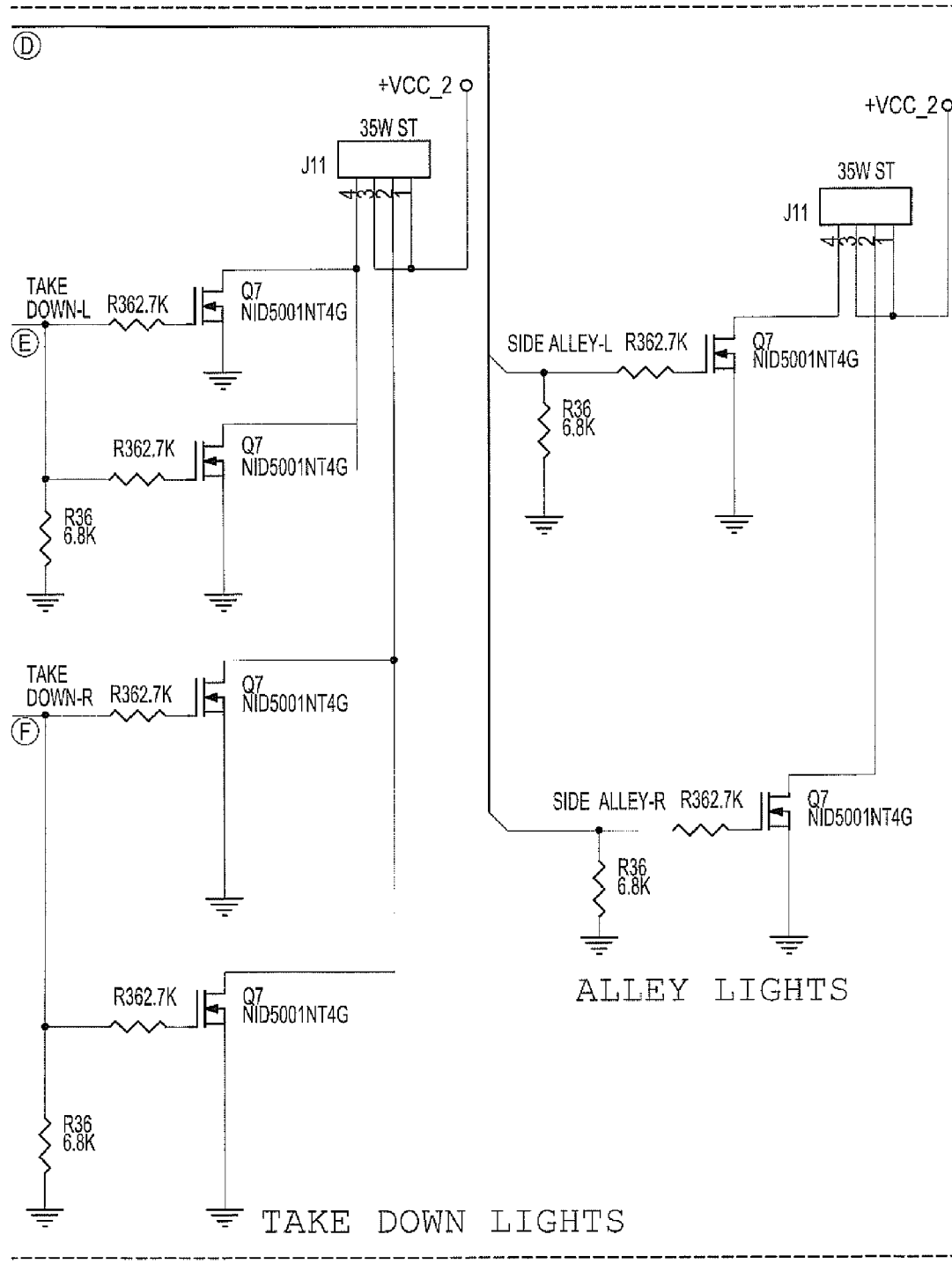
Figure 7D:
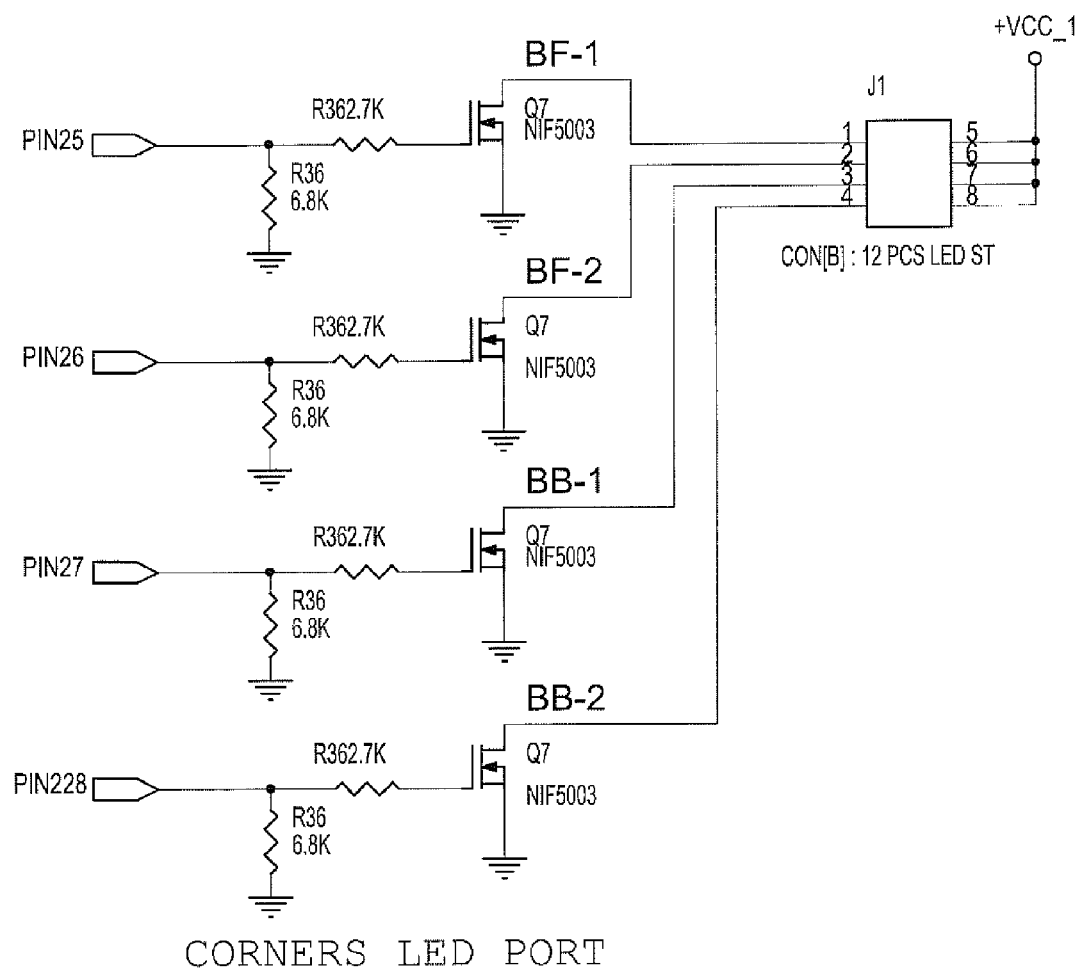
Figure 8A:
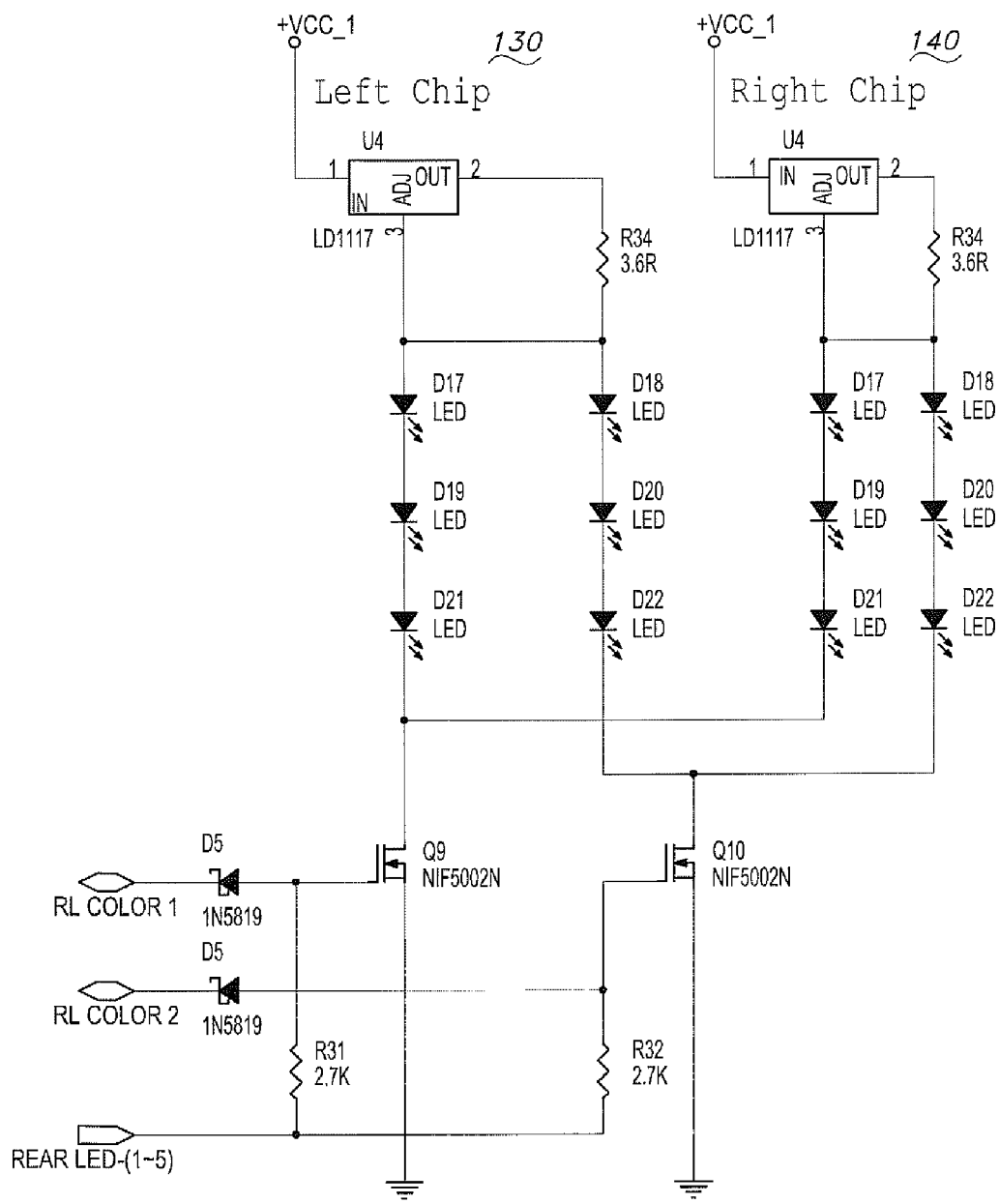
FIGS. 8A and 8B are schematic diagrams in accordance with one embodiment of the present invention of the LED package circuitry.
Figure 8B:
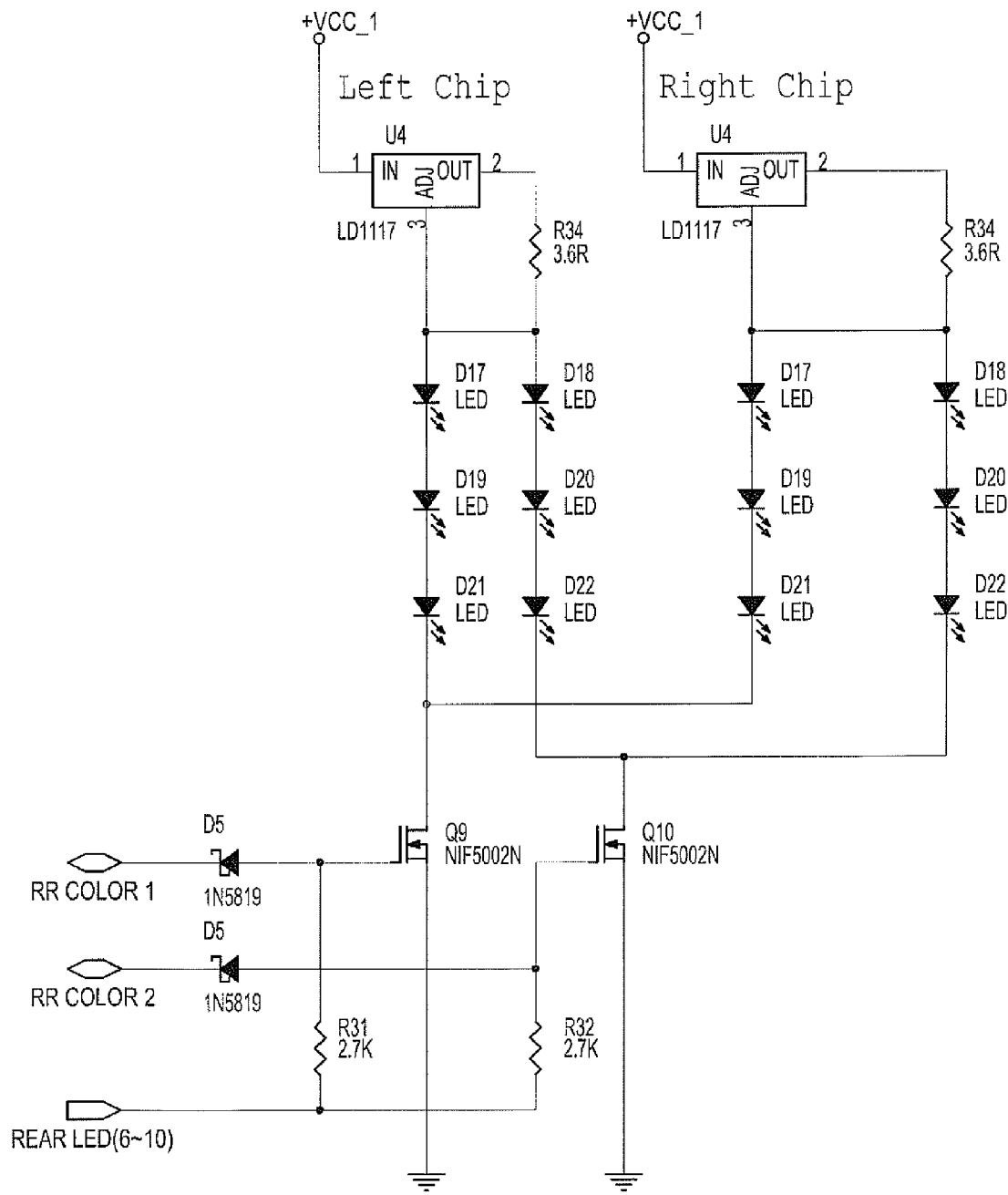
Figure 9C:
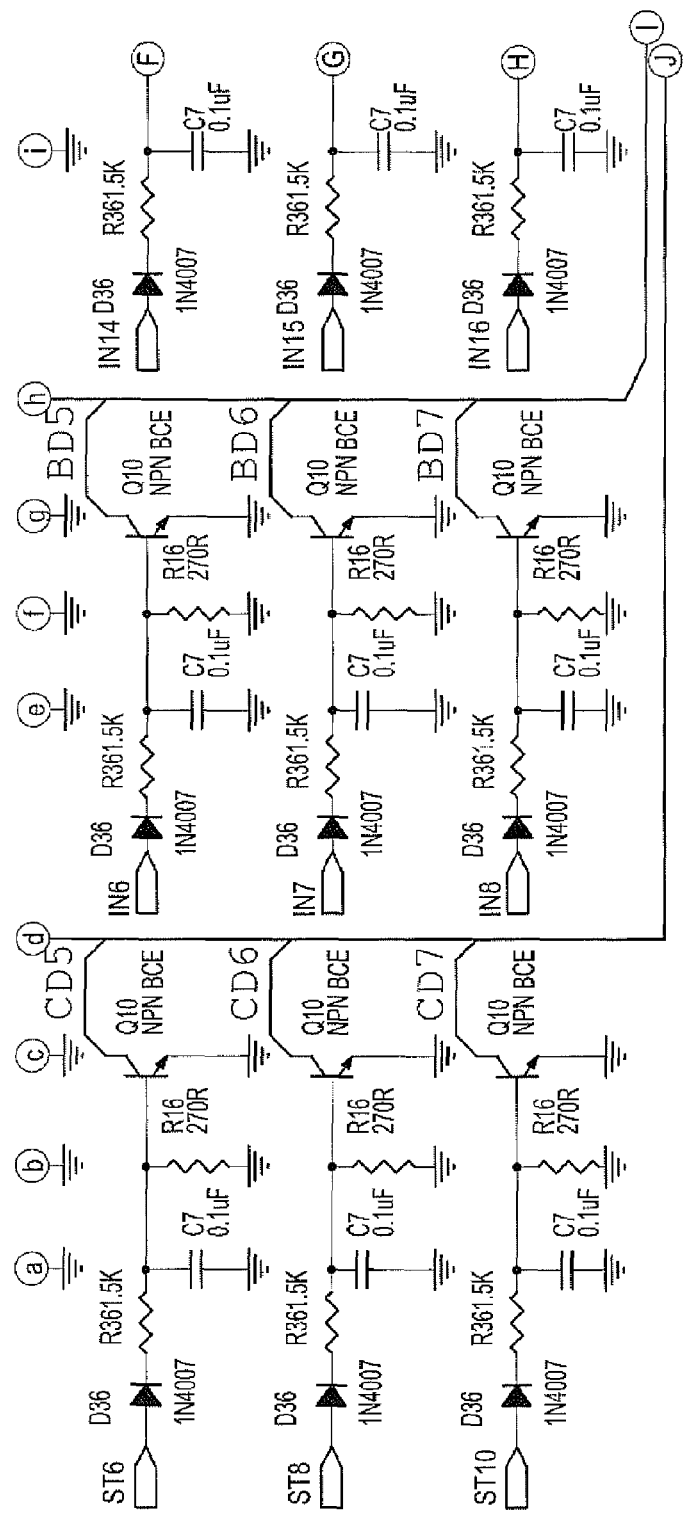
Figure 9D:
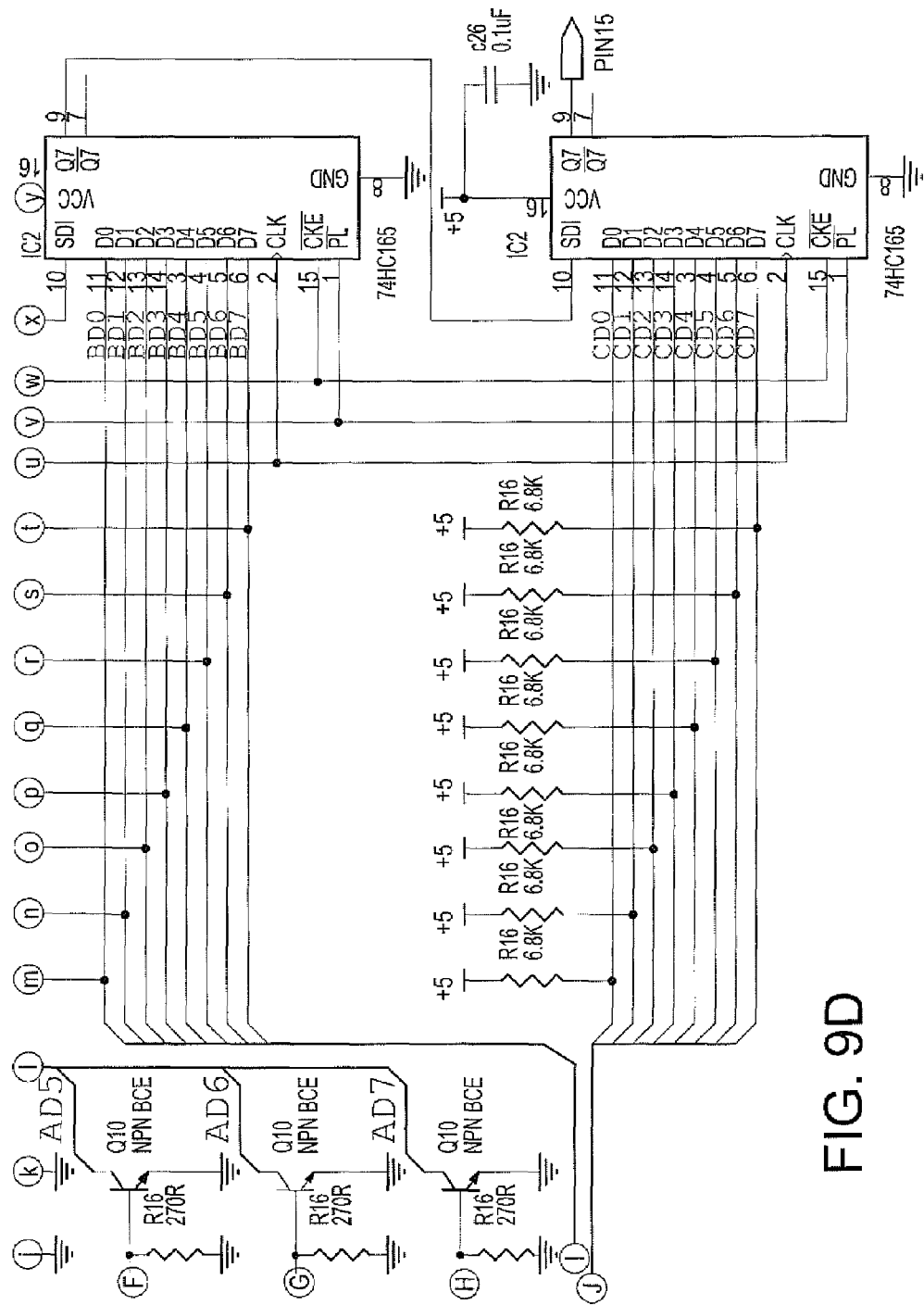

With reference to FIG. 5, each module M includes a plurality of LED packages 110 and a secondary optic lens 120 (as perhaps best illustrated in FIG. 2E), which is typically used with high powered LEDs to narrow down the angle of light output and project the light outwards (similar to a flashlight). In this embodiment, there are six LED packages 110 positioned within the module M. However, it should be appreciated that a greater or fewer number of LED packages 110 may be positioned within each module M depending on the size and particular application for the light bar 10.

Figure 4B:
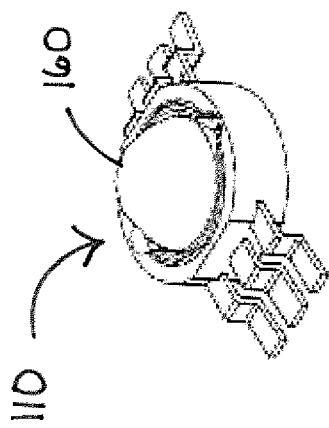
FIGS. 4A-4B are various views in accordance with one embodiment of the present invention of an individual LED package for use with the light bar.
Figure 4A:
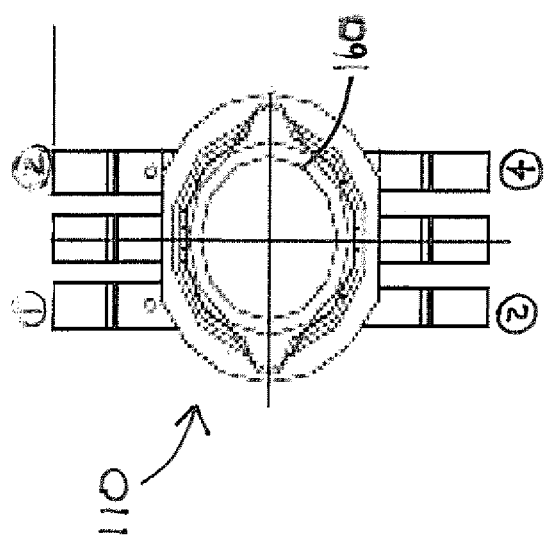

Turning to FIGS. 4A-4B, each LED package 110 includes an individual diode D, two light emitting chips 130, 140, a set of leads 1, 2, 3, 4 and 5 connecting the individual diode D to the light emitting chips and a primary optical lens 160. The LED packages 110 as well as the individual diodes are aligned side-by-side creating a single row within the particular module. Importantly, each individual diode in the LED package will produce a light in a first color and a second color when properly biased. To appropriately bias the individual diode, a drive signal from one of the pair of LED chips 130, 140 within each LED package 110 is sent through certain of the leads 1-5 to trigger the individual diode to produce one of the following three color combinations: blue/amber; red/amber; or red/blue. In other words, one of the chips corresponds to the first color (i.e., the left chip=red or blue) and the other of the chips corresponds to the second color (i.e., the right chip=amber).

In more detail, the light emitting chips 130, 140 drive the color of the individual diode within the LED package 110 through the set of leads 1-5. In order for the diode in the LED package to produce blue or red light (i.e., color 1), leads 2 and 5 are energized to forward bias diode D toward lead 1. In order for the diode in the LED package to produce amber light (i.e., color 2), lead 4 is energized such that diode D is forward biased toward lead 3. As noted above, light bars previously employed LEDs that were a single color (i.e., amber, red, blue, white/clear). In the past, the only way to produce two colors was to have two diodes. Similarly, the only way to produce three colors was to have three diodes. In a single light bar, they also stacked the diodes in rows, which doubled or tripled the number of individually colored diodes depending on the number of colors desired (i.e., 2 or 3) and increased the overall cost and size of the light bar. In this case, the individual diodes are driven by the light emitting chips 130, 140 to produce the desired different colors. Specifically, the individual diode emits either red or blue and amber through the primary optical lens 160. The light output generated by the individual diode is projected through the primary optical lens 160 creating an optical illusion that there is a single LED that is actually changing color.

As shown in FIGS. 6A, 6B, 7A-7D, 8A, 8B and 9A-9D, the LED packages 110 are situated in electrical communication with a controller or processor 170 capable of selectively activating the LED packages 110 in the light bar 10. Activation occurs upon application of a digital signal (Logic 0 or Logic 1) generated from a power source (+Vcc). Also, the controller 170 includes circuitry and is electrically connected to the LED packages 110 through the cable 100. The controller could be a microprocessor, ASIC, collection of chips capable of performing functions or the like. The individual diodes of the LED packages 110 are connected to transistors (generally designated as Q). The transistors Q are connected to the controller 170 through resistors (generally designated as R). The controller 170 is capable of selectively activating the transistors Q such that current flows to activate the selected LED packages 110. Of course, other circuit elements may be used in lieu of or in addition to any of the above-identified elements to activate the LED packages 110 in the light bar 10.

Figure 3:
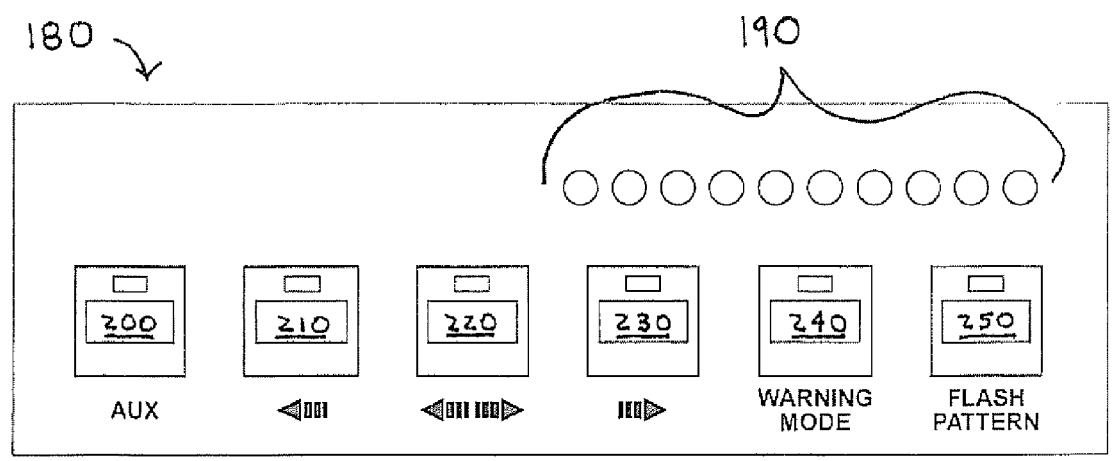
FIG. 3 is a perspective view in accordance with one embodiment of the present invention of a LED indicator input device.

In addition, an optional LED indicator input device 180 for use in conjunction with the light bar 10 is illustrated in FIG. 3. The input device 180 is in electronic communication with the controller 170. The input device 180 is capable of being mounted within the same vehicle that the light bar 10 is mounted. In one embodiment, the input device 180 may be mounted near the operator's seat, such as on the dashboard, console or other passenger compartment in the interior of the vehicle such that the operator may easily access the input device 180. The light bar described herein is not required to be operated by the input device 180. Instead, it may be operated by other input devices or switch control systems as long as there are sufficient control/trigger wires and switches to accomplish the functions described herein.

The input device 180 includes a plurality of LEDs 190 and a plurality of user input buttons 200, 210, 220, 230, 240 and 250 for activating various signal modes discussed above. Each button corresponds to a specific pattern: 200 auxiliary; 210 left directional arrow; 220 center out directional arrows; 230 right directional arrow; 240 warning mode; and 250 flash pattern. The input 180 is connected the LED packages 110 of the light bar 10 via the cable 100.

During use, once the operator of the vehicle reaches his destination (i.e., the scene of the accident), he/she may select the desired flash pattern by pushing one of the buttons on the input device 180. The input device 180 will display the same pattern on the plurality of LEDs 190 as the light bar 10. In order to select any arrow pattern, the operator initially selects/pushes the auxiliary button 200 to activate the amber-colored traffic directional signals and then selects/pushes the desired traffic function button (i.e., 210 for left directional arrow; 220 for center out directional arrows; or 230 for right directional arrow). The input device 180 and light bar 10 may be programmed such that when any arrow function is selected by the operator, traffic mode automatically overrides the warning mode, so only the selected arrow function will be displayed.

Once the operator selects the particular application he/she wants the light bar 10 to perform by pushing the desired input button on the input device 180, a signal is sent to the controller 170. In turn, the controller 170 activates the particular light emitting chip 130, 140 (either red/amber, blue/amber or red/blue) embedded in the LED package 110 to drive the desired color for the individual diode. In this manner, the light bar 10 is capable of producing multiple colors and patterns through the single optical lens 160, which reduces the cost of manufacturing the light bar and the complexity of the design. Moreover, it eliminates the need for two separate light bars for the same vehicle (i.e., one light bar for producing an emergency flashing pattern and another light bar for producing a traffic direction pattern).

Advantageously, the light bar 10 employing the LED packages 110 is capable of displaying multiple colors and patterns to other drivers and pedestrians. Specifically, in the emergency/warning mode corresponding to input button 240, all of the modules (M through M-4) of the first housing 80 display a red flashing pattern. The flashing pattern consists of two quick (approximately 0.1 seconds) flashes of red followed by a continuous red flash (lasting approximately 0.5 seconds). Simultaneously, all of the modules (M-5 through M-9) of the second housing 90 display an identical blue flashing pattern consisting of two quick flashes of blue followed by a continuous blue flash. This pattern is continuously repeated with the two quick flashes followed by the continuous flash until the emergency/warning mode is turned off or switched to a different pattern. Of course, it should be appreciated that the light bar 10 is capable of being programmed to flash a variety of different colors and patterns. For example, the flash pattern could consist of multiple quick red and blue flashes of varying length, continuous red and blue flashes of varying length or a combination thereof.

In the traffic directional mode, the LEDs of the first and second housing 80, 90 of the light bar 10 display amber in various patterns depending on the traffic situation, including left, right and center out directional signals. For example, when there is a traffic accident or a vehicle broken down in the right lane of traffic, a law enforcement officer, emergency personnel or tow truck operator may desire to direct other drivers to clear the right lane and use the left lane(s) of the road/highway or vice-versa if the accident or vehicle is in the left lane. In addition, if there is a multiple-lane highway and an obstruction exists in the middle lane, it may be desirous to use the center-out directional mode.

In left directional signal mode corresponding to input button 210, the LEDs in module M of the first housing 80 display amber, followed by the LEDs in the second module M-1, followed by the LEDs in the third module M-2 and so on until all ten modules (M through M-9) display amber. This pattern is repeated until the left directional signal mode is turned off or changed to another mode. It takes about 1.0 seconds for all of the modules to display amber, so there is approximately 0.1 seconds time lapse between the first module displaying amber and then the second module displaying amber and so on. It should be appreciated that the timing and type of pattern may be adjusted to varying lengths and patterns.

Similarly, in right directional signal mode corresponding to input button 230, the LEDs in module M-9 of the second housing 90 displays amber, followed by the LEDs in the fourth module M-8, followed by the LEDs in the third module M-7 and so on until all ten modules (M-9 through M) display amber. This pattern is repeated until the right directional signal mode is turned off or changed to another mode. Additionally, in the center-out directional mode corresponding to input button 220, the LEDs in module M-4 of the first housing 80 and the LEDs in module M-5 of the second housing 90 display amber simultaneously, followed by the LEDs in module M-3 of the first housing 80 and the LEDs in module M-6 of the second housing 90 and so on until all of the modules are displaying amber. This pattern is repeated until the center-out directional mode is turned off or changed to a different mode.

In the embodiments detailed above, the first housing 80 (which displays the red flashing pattern) includes the first chip 130 that corresponds to the color red and the second chip 140 that corresponds to the color amber. In addition, the second housing 90 (which displays the blue flashing pattern) includes the first chip 130 that corresponds to the color blue and the second chip 140 the corresponds to the color amber. Thus, the light bar 10 is able to display a red flashing pattern and a blue flashing pattern, respectively, in the emergency/warning mode. Moreover, due to the presence of the second chips corresponding to the color amber, the light bar is able to display amber in traffic directional mode.

In other embodiments, such as a single housing light bar having six modules, the first three modules include LED packages having the first chip 130 corresponding to the color red and the second chip 140 corresponding to the color amber, while the remaining three modules have the first chip 130 corresponding to the color blue and the second chip 140 corresponding to the color amber. Thus, the single housing light bar functions in the same manner as the double portion housing in that half the modules (i.e., the first portion) display red in warning mode and amber in traffic directional mode and the modules (i.e., the second portion) display blue in warning mode and amber in traffic directional mode.

Of course, it should be appreciated that the modules may contain different arrangements of the LED packages 110. For example, the first module may contain LED packages having the first chip 130 corresponding to the color red and the second chip 140 corresponding to the color amber, while the second module have the first chip 130 corresponding to the color blue and the second chip 140 corresponding to the color amber and so on. Moreover, the LED packages 110 may contain different arrangements of the light emitting chips 130, 140. Specifically, for a LED package containing ten individual diodes. The diodes may alternate between having light emitting chips corresponding to blue/amber and red/amber.

Advantageously, regardless of which color is being displayed (i.e., red or blue in warning mode or amber in traffic directional mode), all of the optical lenses corresponding to each LED package are displaying a light emitted from a particular diode within the package, so the light output of the light bar is at full strength. In contrast, to the extent known light bars are capable of displaying more than one color, these light bars are not producing as strong a light output because not all the diodes (i.e., the ones in the color not being displayed) are operating. Specifically, these light bars rely upon a number of multi-colored LEDs, so each of the LEDs are not being displayed at a particular time.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention.

What is claimed is:

1. A light bar for a vehicle, comprising:
   a plurality of light emitting diodes aligned in a single row, each of the plurality of light emitting diodes configured to emit two different colors of light; and
   a pair of light emitting chips corresponding equally to each of the plurality of light emitting diodes,
   whereby one of the pair of light emitting chips for each of the plurality of light emitting diodes is energized at a time to produce one of the two different colors of light.

2. The light bar of claim 1, wherein said light bar is capable of producing a single color pattern and a dual color pattern.

3. The light bar of claim 1, further comprising a housing having a base and a cover.

4. The light bar of claim 3, further comprising a plurality of modules positioned within the housing.

5. The light bar of claim 4, wherein the plurality of modules are equally positioned adjacent from each other along the length of the housing.

6. The light bar of claim of claim 4, wherein each of the plurality of modules includes a secondary optic lens covering all of the plurality of light emitting diodes in each of said plurality of modules.

7. The light bar of claim 6, wherein each of the plurality of light emitting diode packages includes a primary optical lens.

8. The light bar of claim 4, further comprising a plurality of light emitting diode packages located in each of the plurality of modules.

9. The light bar of claim 8, wherein the plurality of light emitting diode packages correspond equally to each of the plurality of light emitting diodes.

10. The light bar of claim 8, wherein each of the plurality of light emitting diode packages includes the pair of light emitting chips corresponding equally to each of the plurality of light emitting diodes, whereby a drive signal from one of the pair of light emitting chips is sent through one of a plurality of leads to produce one of the two different colors of light.

11. The light bar of claim 10, wherein a first one of the pair of light emitting chips configured to provide a red or blue color to the corresponding one of the light emitting diodes.

12. The light bar of claim 10, wherein a second one of the pair of light emitting chips configured to provide an amber color to the corresponding one of the light emitting diodes.

13. The light bar of claim 1, further comprising a controller in electric communication with each of the plurality of light emitting diodes.

14. The light bar of claim 1, further comprising an input device having multiple user input buttons for selecting a desired pattern.

15. A multiple color multi-functional light bar for an emergency vehicle, comprising:
    a first housing having a plurality of first light emitting diodes aligned in a single row;
    a second housing having a plurality of second light emitting diodes aligned in another single row; and
    a cable connecting the first housing to the second housing, whereby each of the plurality of first light emitting diodes are configured to emit a first light output in a first color and in a second color and each of the plurality of second light emitting diodes are configured to emit a second light output in the first color and in a third color.

16. The light bar of claim 15, wherein the first light emitting diodes are configured to display the first light output in the first color and the second light emitting diodes are configured to display the second light output in the first color in a desired pattern.

17. The light bar of claim 15, wherein the first light emitting diodes are configured to display the first light output in the second color and the second light emitting diodes are configured to display the second light output in the third color in a desired pattern.

18. The light bar of claim 15, further comprising an input device configured for installation in a passenger compartment of the emergency vehicle, said input device having a plurality of user input buttons for selecting a desired pattern.

19. The light bar of claim 18, wherein the input device includes a display for displaying a pattern identical to the desired pattern displayed by the light bar.

20. A multiple color multi-functional light bar for an emergency vehicle, comprising:
    a housing including a plurality of modules, each of the plurality of modules having at least two light emitting diode packages;
    each of the at least two light emitting diode packages including a pair of light emitting chips connecting to a single light emitting diode;
    each of the single light emitting diodes are aligned in a single row and configured to emit two different colors of light upon receipt of a signal from one of the pair of light emitting chips,
    whereby the light bar is capable of producing a single color light pattern and a dual color light pattern.

* * * * *